(No Model.) 2 Sheets—Sheet 1.
C. W. ISBELL.
APPARATUS FOR GENERATING GAS.
No. 485,009. Patented Oct. 25, 1892.
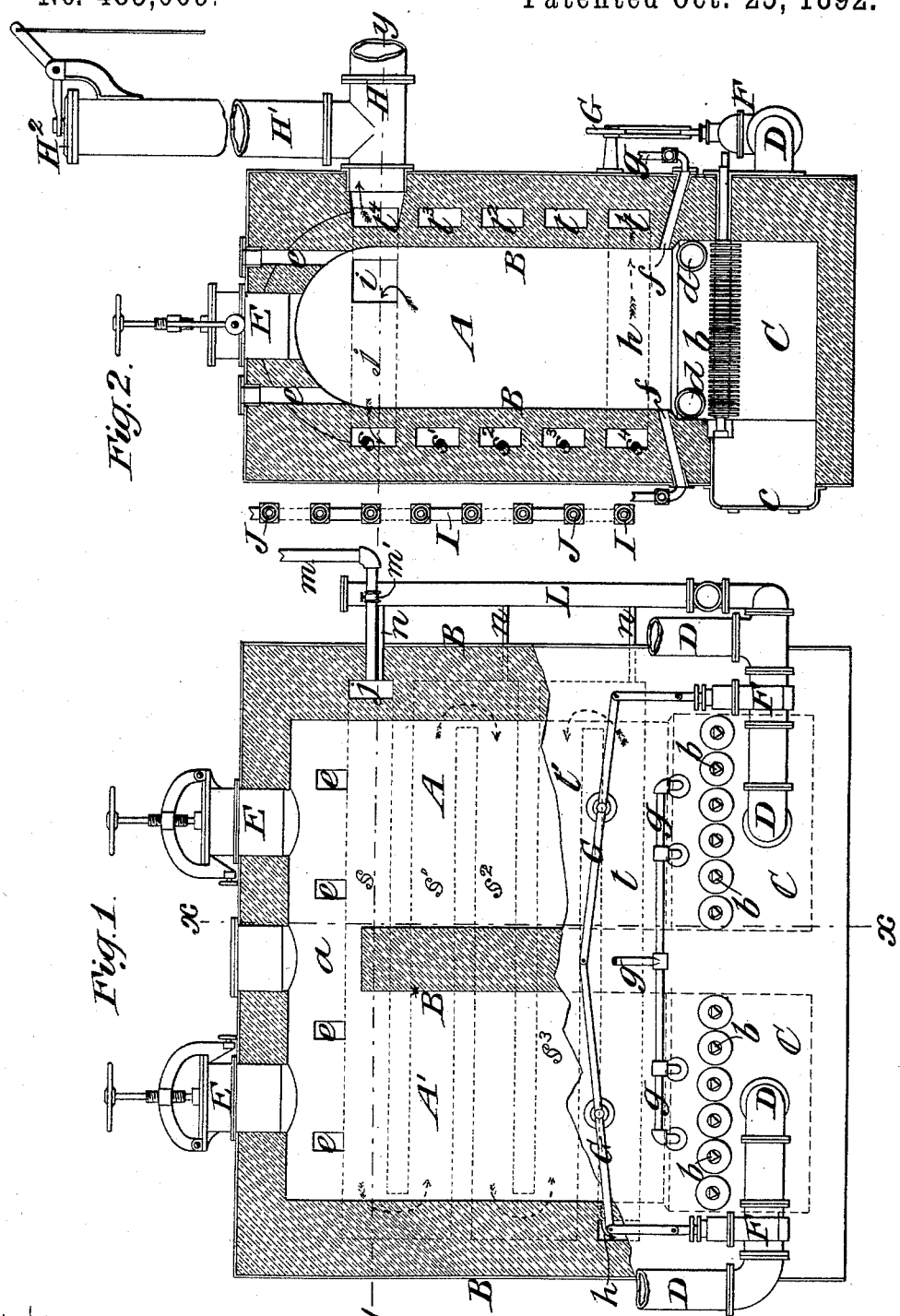

(No Model.) 2 Sheets—Sheet 2.
C. W. ISBELL.
APPARATUS FOR GENERATING GAS.
No. 485,009. Patented Oct. 25, 1892.
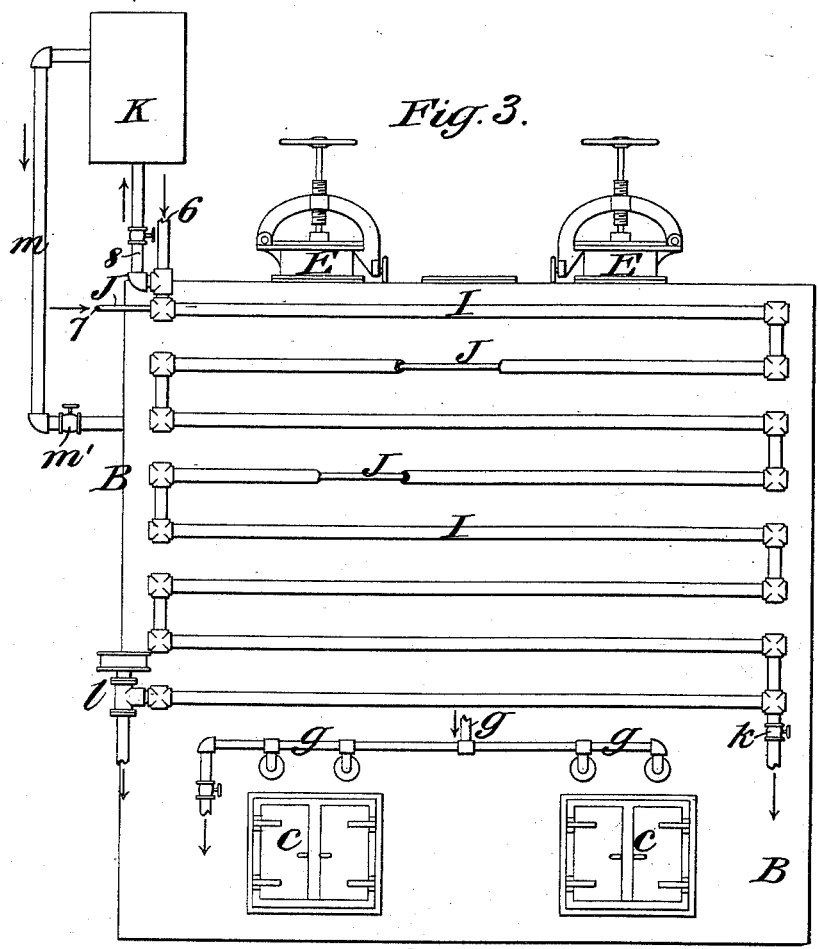
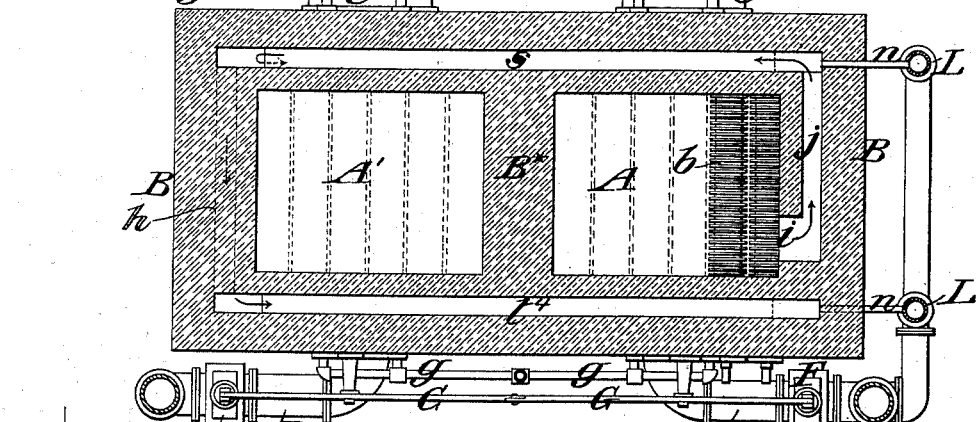

UNITED STATES PATENT OFFICE.

CHARLES W. ISBELL, OF NEW YORK, N. Y.

APPARATUS FOR GENERATING GAS.

SPECIFICATION forming part of Letters Patent No. 485,009, dated October 25, 1892.

Application filed May 6, 1892. Serial No. 432,026. (No model.)

*To all whom it may concern:*

Be it known that I, CHARLES W. ISBELL, of the city and county of New York, in the State of New York, have invented a new and useful Improvement in Apparatus for Generating Gas, of which the following is a specification.

This improvement relates, generally speaking, to apparatus for the production of what is commonly known as "water-gas" for illuminating purposes by first passing steam through incandescent coal to obtain a gas or gases consisting of carbonic oxide and hydrogen, then adding to such gas or gases a proper quantity of the vapor of a hydrocarbon oil or liquid, and finally subjecting the said gas or gases and vapor together to a heat sufficient to convert the mixture into a permanent gas.

The invention relates particularly to the provisions hereinafter described and claimed for the heating and thereby converting or, as it is commonly termed, "fixing" the said mixture, such provision consisting principally in passages formed within the outer walls of the chambers or furnaces in which the carbonic-oxide and hydrogen gases are generated, such passages constituting fixing-retorts heated by the gases and gaseous products of combustion from the said generating chambers or retorts.

Figure 1 represents an elevation, partly in section, of an apparatus for generating gas embodying my invention. Fig. 2 represents a transverse section taken in the line $x\ x$ of Fig. 1 and viewed from the left. Fig. 3 represents an elevation of the side opposite to that shown in Fig. 1. Fig. 4 represents a horizontal section in the line $y\ y$ of Figs. 1 and 2.

Similar letters and numerals of reference designate corresponding parts in all the figures.

A A′ are chambers for the generation of the carbonic oxide and hydrogen represented as formed in a furnace-like structure B and separated by a partition-wall B*, which, not extending to the top, leaves a communication between them, as shown at $a$ in Fig. 1. Two such chambers are represented; but the number is immaterial. There might be only one. At the bottom of each chamber is a grate composed of bars $b$, below which is an ash-pit C, provided on one side with an air-tight door $c$ and having connected at its opposite side a pipe D for the introduction of air under pressure from any suitable blowing apparatus. Above the grate there are clearing-holes $d$, Fig. 2, for cleaning out the bottom of the furnace. There are also clearing-holes $e$, Figs. 1 and 2, at the top for the introduction of irons for cleaning the side walls. At the top there is also a hopper E for the introduction of coal, and near the bottom there are on opposite sides openings $f$ for the introduction of steam supplied by a pipe $g$ from any suitably-located boiler.

The pipes D are furnished with valves F, controlled by levers G, for the purpose of admitting and shutting off the supply of air through the pipes D to the ash-pits C.

So far as I have at present described the apparatus it does not differ materially from other apparatus employed for the generation of carbonic oxide and hydrogen by causing steam to pass through incandescent coal.

I will now proceed to describe the features which constitute my invention.

In the front and rear walls of the furnace B—that is to say, in the front and rear walls of the generating-chambers—are built a series of flue-like passages arranged one above another and extending nearly the whole length of the structure and constituting fixing-retorts, those on the front wall being designated by $s\ s'\ s^2\ s^3\ s^4$ and those on the rear wall being designated by $t\ t'\ t^2\ t^3\ t^4$. The several passages of the series in either wall have such communication each with the one above or below it at opposite ends alternately that a circulation is provided for from one to the other throughout the series. This may be understood by reference to Fig. 1, where parts of both series are shown in dotted outline. The circulation through the series $s\ s'\ s^2\ s^3\ s^4$ in this example is downward and that through the series $t\ t'\ t^2\ t^3\ t^4$ is upward. The lower passages of the two series are in communication through a cross-passage $h$. (Shown in section in Fig. 1 and in dotted outline in Figs. 2 and 4 in one of the end walls.) In the upper part of the chamber A (see Fig. 2) is a gas-outlet $i$, which is common to both chambers, as they are always in communication over their partition-wall B*, and from this outlet a cross-passage $j$ runs to the upper passage $s$. The final outlet for gas after passing through the several passages in the walls is from the upper passage $t^4$ by a pipe H. On this pipe is an upright pipe H', which serves as the chimney in blowing up the fires in the furnace, but at other times is closed by a damper $H^2$.

The vaporizing apparatus for vaporizing the hydrocarbon oil or liquid to be added to the carbonic oxide and hydrogen gases generated in the chambers A A' is represented as consisting of an upright gridiron coil or pipe I, through which passes a similar coil of smaller pipe J. The oil or liquid to be vaporized is introduced at 6 by a pump or otherwise into the upper part of the coil I, and steam, preferably superheated, is introduced at 7 to the upper part of the coil J. At the bottom of the coil I is provided a cock $k$ for drawing off the heavy waste of the oil or liquid, and at the bottom of the coil J is provided a steam-trap $l$, which provides for the escape of water of condensation from the said coil.

At the upper end of the coil J, besides the inlet 6, there is provided an outlet-pipe 8 for the hydrocarbon vapors generated in the coil I by the heat of the coil J, the said pipe 8 leading to a reservoir K, whence the said vapor passes out by a pipe $m$, which enters the passage $j$ near the outlet $i$ of the generating-chambers, and so delivers the vapor into the gases escaping from the generating-chambers. This pipe is represented as furnished with a cock at $m'$.

For the purpose of introducing air into the series of passages $s\ s'\ s^2\ s^3\ s^4$ in the walls of the structure B, containing the chambers A A', I have shown a branch pipe L from one of the air-pipes D, and several smaller branch pipes $n$, leading from the said branch pipe L into the said series of passages, the object of thus admitting the air being to complete the combustion in the said passages of gases which are generated in the chambers A A' and which escape from the said chambers through the said passages during the blowing up of the fires, such combustion serving to increase the heat of said passages for the subsequent operation of converting or fixing the mixture of carbonic oxide and hydrogen and carbonic vapor passing therethrough.

To start the operation of the apparatus, the chambers A A' are charged with coal, the fires are lighted, the outlet of the pipe H is closed and that of the air-pipe H' or chimney is opened, the hydrocarbon-vapor pipe $m$ being shut off, the air being admitted through the pipes D under and through the grates and also through the pipe L and its branches $n$ into the passages in the side walls of the generating-chambers. The coal in the chambers A A' being brought to a sufficient heat, the air is all shut off, the pipe H' is closed and the pipe H opened, and steam is admitted to the chambers through the pipes $g$ and openings $f$. The generation of gas then commences in the said chambers, and as fast as the gas is generated it passes out through the outlet $i$ into the cross-passage $j$, where it is met by the hydrocarbon vapor introduced by the pipe $m$. The gas and vapors then passing through the flue $j$ into the passage $s$, thence successively through the other passages $s'\ s^2\ s^3\ s^4$ in the same wall and afterward through the cross-passage $h$ into the retort $t$ in the other wall, and thence through the other passages $t'\ t^2\ t^3\ t^4$ in the last-mentioned wall, are kept for a long time subject to intense heat and are first thoroughly mixed and afterward converted into a fixed or permanent illuminating gas, in which condition it passes off from the upper passage $t^4$ by the pipe H.

It will be observed that the series of passages constituting retorts in the front and rear walls of the furnace and the cross-passages in the end walls also constitute a descending flue on one side and an ascending flue on the opposite side of the furnace, the said flues communicating with each other, and so constituting a continuous system of flues between the combustion-chamber of the furnace and the final outlet for the gas through the pipe H.

What I claim as my invention, and desire to secure by Letters Patent, is—

1. The combination, in a gas-generating apparatus, of a combustion-chamber or furnace having in each of two of its opposite walls a series of passages arranged one above another and communicating one with another at opposite ends alternately and having, also, within its walls a cross-passage from one of the passages of one of said series to one of the passages of the other of said series, one of said series of passages communicating at its upper end with the combustion-chamber and the other of said series of passages communicating at its upper end with the final outlet of the apparatus, an oil-vaporizer outside of the furnace, and a pipe for introducing the vapor from said vaporizer into the upper passage of that series which is in communication with the combustion-chamber, substantially as herein set forth.

2. The combination, with the furnace having a series of communicating passages one above another in its opposite side walls, those of said passages on one side constituting a flue with a descent from the combustion-chamber and those on the opposite side constituting a flue with an ascent to its final outlet, and an air-supply pipe with branches entering said passages at numerous intervals at different distances from the furnace and final outlet, substantially as and for the purpose herein set forth.

CHARLES W. ISBELL.

Witnesses:
FREDK. HAYNES,
L. M. EGBERT.